(12) United States Patent
DeCusatis et al.

(10) Patent No.: US 7,484,896 B2
(45) Date of Patent: Feb. 3, 2009

(54) CONNECTOR ASSEMBLY WITH INTEGRATED ELECTROMAGNETIC SHIELD

(75) Inventors: Casimer M. DeCusatis, Poughkeepsie, NY (US); John H. Quick, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/314,665

(22) Filed: Dec. 21, 2005

(65) Prior Publication Data
US 2007/0140621 A1    Jun. 21, 2007

(51) Int. Cl.
*G02B 6/36* (2006.01)
(52) U.S. Cl. ........................................................ 385/53
(58) Field of Classification Search .................. 385/53, 385/58, 59, 76
See application file for complete search history.

(56) References Cited

U.S. PATENT DOCUMENTS

| | | | | |
|---|---|---|---|---|
| 3,243,756 | A | * | 3/1966 | Ruete et al. .................... 439/89 |
| 5,574,815 | A | * | 11/1996 | Kneeland ...................... 385/101 |
| 5,960,136 | A | | 9/1999 | Shakhman et al. ............. 385/53 |
| 6,000,856 | A | * | 12/1999 | Yunker .......................... 385/75 |
| 6,085,006 | A | | 7/2000 | Gaio et al. |
| 6,158,899 | A | | 12/2000 | Arp et al. ....................... 385/53 |
| 6,241,398 | B1 | | 6/2001 | Correa et al. .................. 385/75 |
| 6,482,017 | B1 | | 11/2002 | Van Doorn .................... 439/89 |
| 6,568,861 | B2 | | 5/2003 | Benner et al. .................. 385/55 |
| 6,607,303 | B2 | | 8/2003 | Ngo et al. |
| 6,887,105 | B2 | * | 5/2005 | Knighten et al. ............. 439/610 |
| 2002/0064349 | A1 | | 5/2002 | Ngo et al. |
| 2003/0024717 | A1 | * | 2/2003 | Knighten et al. ........... 174/35 R |
| 2003/0072536 | A1 | * | 4/2003 | Shibutani et al. .............. 385/70 |

FOREIGN PATENT DOCUMENTS

WO    WO 02/079841 A1    10/2002

OTHER PUBLICATIONS

"Pluggable EMC Shield and Cable Strain Relief System", R. L. Byrum et al., IBM Technical Disclosure Bulletin, vol. 30, No. 6, Nov. 1987, pp. 76-78.

* cited by examiner

*Primary Examiner*—Chau N Nguyen
(74) *Attorney, Agent, or Firm*—William A. Kinnaman, Jr.; Arthur Ortega (57) ABSTRACT

A conductive, compliant, deformable boot for a fiber optic or other cable assembly is described, which both provides traditional cable strain relief functions and extends over the body of the connector to form an electrically conductive shield over the cable receptacle aperture when the cable assembly is plugged into the aperture. The boot deforms slightly upon insertion of the cable assembly and compresses against a mating component to form a shield against electrostatic discharge which can accumulate on the cable or card and also to shield against electromagnetic emissions entering or leaving the circuit card package. The boot also shields against emissions when two cable assemblies are mated together by deforming slightly upon mating and then returning to its original state when the assemblies are disconnected.

10 Claims, 5 Drawing Sheets

CONNECTOR ASSEMBLY WITH INTEGRATED ELECTROMAGNETIC SHIELD

BACKGROUND OF THE INVENTION

1. Field of the Invention

This invention relates to electromagnetic shielding for copper and optical interfaces with pluggable transceivers and in particular to shielding used for parallel interfaces such as used on InfiniBand optical links. More specifically, this invention relates to pluggable transceivers for both copper and optical parallel interfaces.

2. Description of the Related Art

Pluggable interconnects are an industry trend and have already been accepted in other standards. Specifically, serial transceivers with pluggable interfaces are available today at data rates up to 10 gigabits/second (Gbit/s), and parallel interfaces with similar per line data rates are available. There are a number of reasons why pluggable interfaces have been accepted by the industry. First, they provide the ability to easily switch between different types of physical layers, such as between copper and optical or between short-wavelength and long-wavelength optical links for increased distance. This can be done either in the field, with the transceiver as a replaceable unit to reduce field service costs, or at end of the link manufacturing process to reduce the cost of customizing a card and minimize the use of unique card part numbers. Since a transceiver is typically the only pin-through-hole (PTH) solderable component on a card, migration to a pluggable interface with a surface-mounted receptacle can result in significant manufacturing cost reductions (e.g., 20-30%). Furthermore, the industry is moving to new environmental regulations that require lead-free solders and higher soldering temperatures. By using pluggable transceivers, one can avoid exposing the transceiver to elevated temperatures during card build or rework. This significantly improves reliability, especially for optical links whose lasers are sensitive to temperature. Since the optical transceiver is often one of the most complex and failure-prone components on a card, this is an important benefit.

However, the combination of pluggable transceivers with higher data rates and parallel links leads to a new set of design problems. In particular, there is a concern with the resistance to electrostatic discharge (ESD) and electromagnetic interference (EMI) leaking onto and off the cards over these interfaces. Consider the example of a parallel optical link, with 12 lasers having a 250-micron (0.25-millimeter) center-to-center spacing in a single package. Each laser is driven by differential serial lines at 10 Gbit/s. Because there are so many high-speed serial lines close together, their radiated noise adds up and can produce higher field strengths within the module than a single 10-Gbit/s serial device. This high frequency noise can escape from the transceiver or card package through apertures as small as 0.07 millimeter (mm). Although high frequencies attenuate quickly, applications such as high-density switches may place tens of transceivers in closely packed proximity to one another on a card. This noise can also re-radiate from secondary sources, such as metal in the cable connectors. Thus, even small noise leakage can cause the switch to violate FCC class B radiated noise requirements unless the aperture around the transceiver is properly shielded. High-frequency noise from adjacent switch ports can also be picked up without proper shielding and introduce bit errors on the link. Since the transceivers are mounted on the card edge with direct access to the outside environment and serve as a user interface for plugging cables, they are further exposed to ESD shocks from handling of cables, connectors, and cards.

Figure 1:
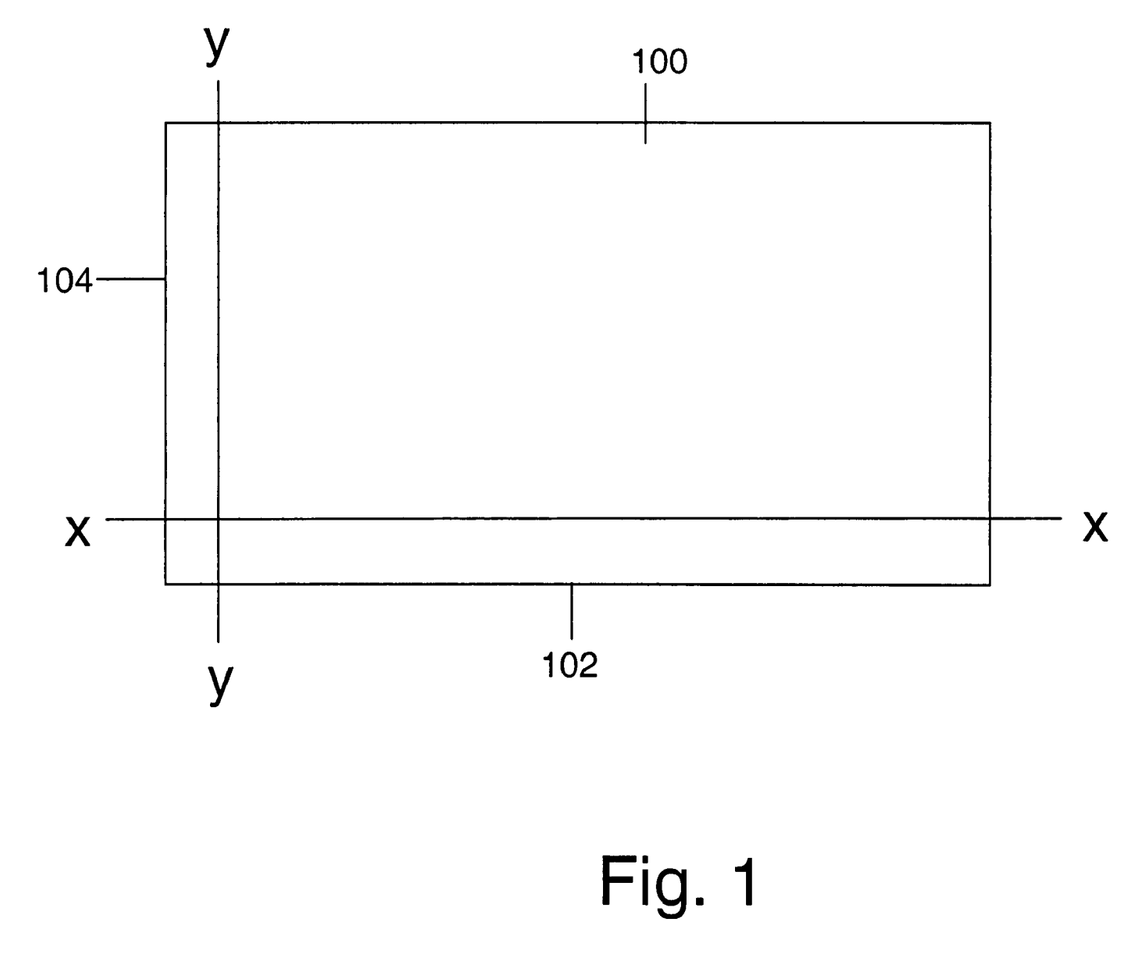
FIG. 1 shows the dimensional tolerances on a typical PCI-type adapter card edge.

Thus, proper EMI/ESD shielding of these new interfaces is critical. However, conventional shielding approaches may not be adequate because of the pluggable transceiver design. As shown in FIG. 1, the dimensional tolerances between the edges x-x and y-y of a transceiver module (not shown) and the corresponding edges 102 and 104 of a typical PCI-type adapter card 100 are ±20 mils (≈0.5 mm). Thus, a pluggable transceiver receptacle can be placed on the card within 20 mils of a card edge. However, most industry optical component multi-source agreements specify that the length of a parallel transceiver has a tolerance of ±1 mil (≈0.025 mm). This leaves a potential gap between the transceiver nose and the card edge, which needs to be shielded. In the past, transceivers were soldered onto the card and the nose was grounded to the card bezel by flexible metal fingers on an EMI shroud or a gasket which would compress up to 50% when the card bezel is assembled. This approach is not workable for a pluggable transceiver; further, it is probably not adequate to shield against higher-frequency noise on the new parts. Since the transceivers can be inserted or removed in the field, a fixed compression gasket or shield on the transceiver nose is not an option, either. Therefore, an object of this invention is to develop an acceptable way to shield the transceiver opening on a pluggable, high-data-rate parallel interface.

There have been a number of previous efforts to shield or control electromagnetic radiation from various types of apertures. Each of these previous efforts, however, has its drawbacks.

Byrum et al., in their publication "Pluggable EMC Shield and Cable Strain Relief System", *IBM Technical Disclosure Bulletin*, vol. 30, no. 6, pp. 76-78 (November 1987), describe a metal cable collar and conductive rubber cable-receiving rack designed to provide both strain relief and electromagnetic conduction noise (EMC) shielding of copper cables. The teachings of this publication cannot be usefully applied to fiber optic ribbon cables used for InfiniBand, which have a significantly smaller diameter than the copper cables assumed by this reference. (InfiniBand is a trademark of the InfiniBand Trade Association.) This publication describes a method for clamping and screwing the shield around the cable, which would damage a fiber optic cable or induce microbending loss. Further, this shield is applied to the cable itself, not to the card edge connector. Since all of the noise from a fiber optic interface is conducted through the card edge (the glass and polymer fiber cable is nonconductive), the disclosed system would not be useful for fiber optic cables.

U.S. Pat. No. 5,960,136 (Shakhman et al.) describes a conductive shield formed around a fiber optic connector and panel opening, using conductive metal fingers or springs which extend from the optical connector and contact the card edge receptacle (which is also assumed to be conductive). These fingers or springs are intended to compress against the card receptacle when the fiber connector is inserted. The patent describes an array of fingers or springs surrounding the fiber optic connector, which is only practical for relatively large connectors. This approach would not scale well to an MPO-type ribbon connector used in parallel optics. Further, this approach still leaves gaps between the fingers or springs which are susceptible to radiated noise leaking into or out of the optical interface.

U.S. Pat. No. 6,158,899 (Arp et al.) describes a two-piece rigid metal or metallized plastic assembly which can be clipped over a fiber optic connector and receptacle after the cable has been plugged in. The two-piece shield makes contact with the card receptacle and forms a shield around the optical connector. This approach requires that the shield be assembled around the fiber optic interface after the cable has been plugged in; the shield must be removed in order to unplug the cable. This has several drawbacks; it requires a separate mechanical feature on the receptacle, such as a slot or screw hole, to attach the two-piece shield and make electrical contact with the card edge. It is cumbersome to attach and remove the shield every time the cable is plugged. In the case of InfiniBand, the transceivers themselves may be pluggable into the card, which further complicates the process (in order to unplug a transceiver, the shield must be removed, the cable unplugged, and then the optics removed, while the process is reversed to re-insert the optics). The shield is disassembled into two parts, so one or both may be misplaced during the assembly process. A molded metal shield will be heavy (possibly bending the optical fibers) and likely expensive; a metallized plastic shield is susceptible to scratching, which would compromise the protection.

U.S. Pat. No. 6,241,398 (Correa et al.) describes a conductive tubular member (such as an ST-type single-fiber connector), made of an electrically conductive elastomer, which slides over a nut projecting beyond a faceplate to form an EMC shield when the optical connector is inserted into the receptacle. This takes advantage of the fact that ST-type connectors require a metal receptacle with locking pins formed in the proper locations to fully engage the optical connector. This approach does not extend to an MPO-type ribbon connector, which does not have a metal sleeve and may not even be conductive. While this approach is useful for single fiber connectors with metal receptacles like the ST, it does not apply to nonconductive plastic connectors for ribbon fibers.

U.S. Pat. No. 6,482,017 (Van Doom) describes an EMI shield, strain relief boot, and dust cover for optical interfaces. The design goal is protection against electromagnetic interference (EMI), and does not explicitly include EMC protection. The required size of this approach is larger than it would otherwise have to be, since it also needs to serve as a strain relief and dust protection for the interface. The EMC shield incorporated into the boot consists of either a plurality of conductive wires, a plurality of conductive particles, a magnetic material, or a conductive layer incorporated into the boot structure. This extends over most (but not all) of the area surrounding the optical receptacle; some of the area is left unprotected. The boot tapers towards the receptacle, and does not insure physical contact between the boot and the card edge; there is also no guarantee of electrical contact between the boot and a conductive surface on the card, to protect against EMC (the boot only contacts the optical connector receptacle, which may be nonconductive plastic; the invention could be modified to include metal edges on the receptacle, but this would require an additional feature). The resulting gaps or spaces may reduce the shielding effect. Finally, the boot body must be configured to limit the cable bend radius.

PCT Patent Publication WO 02/079841 (Robinson et al.) describes a conductive cable boot and shield based on the waveguide-beyond-cutoff principle; the dimensions of the boot are such that it will not support propagation of EMI noise modes beyond a predetermined cutoff frequency, thus preventing the noise from coupling out of the receptacle. The boot is constructed such that its typical length is at least five times its width, thereby blocking EMI with destructive interference. This is much larger than would ordinarily be required for a shield; also, the dimensions are relatively critical. (For example, the patent publication describes this boot as having an internal angle of 18.5° with a tight tolerance in order to provide the waveguide cutoff function.) Further, InfiniBand uses arrays of lasers and drive circuits in close proximity, and may generate harmonics that penetrate a shield based on waveguide principles.

U.S. Pat. No. 6,568,861 (Benner et al.) and U.S. Pat. No. 6,607,303 (Ngo et al.) are very similar in that both describe a fiber optic adapter mounted through a panel opening which makes conductive contact with the opening in order to shield cables which pass through the aperture. This is basically a split sleeve LC-type optical coupler with metal shielding to protect the optical interface between two fiber connectors. This approach does not apply to the interface between an optical connector and a card edge receptacle, since by its nature the coupler extends into both sides of the aperture; thus it cannot accommodate an optical transceiver, which would have to extend partially through the aperture and which does not have a conductive receptacle.

SUMMARY OF THE INVENTION

The present invention contemplates an EMI/ESD shield that is incorporated directly into the cable boot of a parallel optical or other pluggable connector. The boot extends slightly beyond the connector body so that it always comes into contact with an opposing conductive surface, such as a card bezel plate when the connector is plugged into a transceiver. The EMI boot is made of a conductive, slightly compressible rubber-type material. Any materials, such as conductive rubbers, that have the desired compressibility and conductivity and are otherwise suitable may be used.

More particularly, in one aspect, the present invention contemplates a cable boot for use in a connector assembly, especially a fiber optic connector assembly, in which a fiber optic or other connector terminating one end of a cable is adapted to be connected to a mating component, the mating component having a transversely extending conductive surface portion and a receptacle accessible through an opening in that surface portion for receiving the connector when the connector is connected. In accordance with this aspect of the invention, the cable boot comprises a resilient, conductive material and is adapted to be fitted on the cable. The cable boot has a forwardly projecting portion having a broad leading edge portion adapted to press against the transversely extending conductive surface portion to form a resilient seal therewith when the connector is connected, thereby electromagnetically shielding the connector and the receptacle.

Where the connector assembly is a fiber optic connector assembly, the mating component may comprise an optical transceiver, in particular a pluggable transceiver having the receptacle at one end. In such case, the cable boot is adapted to envelop the end of the transceiver when the fiber optic connector is connected thereto (by inserting it into the receptacle). As one alternative, the mating component may also comprise another fiber optic connector.

Preferably, the cable boot surrounds the connector from a distal end to a proximal end relative to the receptacle. Preferably in such case, the cable boot is also adapted to close around the distal end of the connector to retain its position and orientation with respect to the connector. The cable boot is also preferably removable from the connector. Additionally, in environments where the receptacle projects beyond the transversely extending conductive surface portion of the mating component, preferably the forwardly projecting portion of the cable boot is formed with a concavity for receiving the receptacle portion projecting beyond the transversely extending conductive surface portion when the connector is connected. In such instances, the forwardly projecting portion of the cable boot preferably extends beyond the connector when the connector is disconnected.

In another aspect, the present invention contemplates a connector assembly comprising a cable and a connector as described above, together with a cable boot as described above fitted on the cable.

The EMI boot of the present invention provides a shield completely surrounding the transceiver aperture, protecting against both radiated noise leaking out of the transceiver port and radiated noise from other sources, such as adjacent ports, leaking back into the transceiver. The boot also shields against secondary radiation from metal within the connector body. Additionally, the boot serves as an ESD shield, since it is conductive and dissipates harmlessly through the card bezel any static charge that has accumulated during handling. Since the boot is part of the cable assembly, it works with existing transceivers and cards; alternative embodiments can be retrofitted to the cables in the field. An alternative embodiment, shown in the accompanying figures, adapts this invention to the front tailstock on enclosures.

There are no known similar designs in the prior art; indeed, fiber optic connectors have avoided any attempts at shielding because optical cables and connectors are non-conductive. However, without using the present invention, it may not be possible or practical to implement large-port-count switches with pluggable interfaces; no feasible alternatives currently exist. The present invention has other potential applications, such as larger parallel array optical interconnects (up to 8×12 laser arrays on 250 micron centers, in the same form factor used today for 1×12 interconnects). It could also offer performance improvements on existing 1×12 arrays in high-density designs.

The present invention may be used for InfiniBand cables, to name but one example. In contrast to such prior approaches as that of Shakhman et al., the present invention covers the entire interface and receptacle area with a conductive rubber shield, eliminating gaps which can pose a problem for parallel optics because of the higher levels of radiated noise. The present invention offers a single-piece conductive rubber boot which surrounds the optical connector and does not require separate removal when the connector is plugged, thus overcoming the drawbacks of such approaches as that of Arp et al.

The present invention has other advantages as well. It requires a smaller, lower-cost shield, in which the dimensions are relatively uncritical. It forms a tight seal with plenty of margin to avoid air gaps that can leak radiated noise. The boot body does not have to be configured to limit the cable bend radius. The present invention also does not require embedded wires, coatings, or magnetic materials (the latter could damage any electronic chips it comes in contact with); rather, it relies on a conductive material such as rubber. Since the present invention is not based on waveguide principles, it does not have the drawbacks associated therewith. Finally, the present invention provides the means to protect an optical transceiver receptacle as well as a cable connector.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 2:
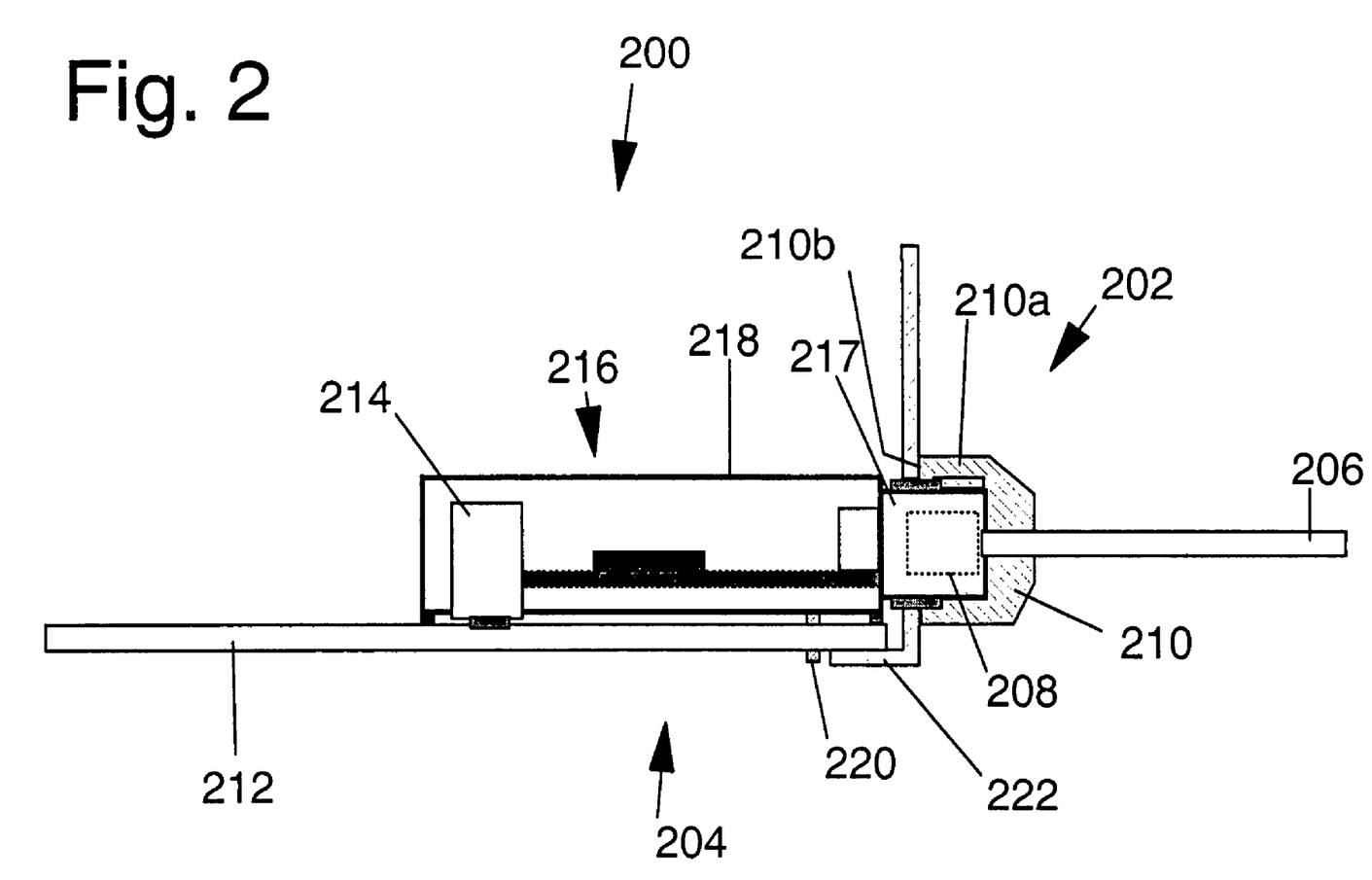
FIG. 2 illustrates one example of a preferred embodiment.

FIG. 2 illustrates one example of a preferred embodiment 200 in which a fiber optic cable assembly 202 connects to a card assembly 204. Cable assembly 202 comprises a fiber optic cable 206 having a connector 208 as well as the boot of the present invention, to be described below. Except for the boot, cable assembly 202 is of conventional design.

Card assembly 204, which is likewise of conventional design, comprises a printed wiring board (PWB) 212 which carries a surface mount technology (SMT) connector 214 for receiving a pluggable optical transceiver 216 with a parallel interface; "parallel" here refers not to the electrical interface, but to the fact that transceiver 216 transmits and receives optical streams over a plurality of channels (not separately shown), which are typically displaced from one another in the direction of the view. Optical transceiver 216 has a receptacle 217 at one end for receiving the connector 208. Connector 208 and receptacle 217 are each formed with corresponding apertures (not shown) for the individual optical streams. Optical transceiver 216 also includes an electrically conductive shield enclosure 218, which generally envelops the transceiver 216 except as necessary to accept connector 214 and fiber optic connector 208. One or more compliant pin retention posts 220 carried by the board 212 secure the transceiver 216 to provide strain relief for the connector assembly 202 (so that pulling on the connector assembly 202 does not dislodge the optical transceiver 216 from the connector 214). Finally, board 212 carries a conductive front tailstock 222, which extends transversely of the transceiver axis and, in conjunction with the enclosure 218, forms an electrical shield around module 216. Front tailstock 222 has an opening formed therein, through which receptacle 217 projects to receive the connector 208 of the connector assembly 202.

Figure 5:
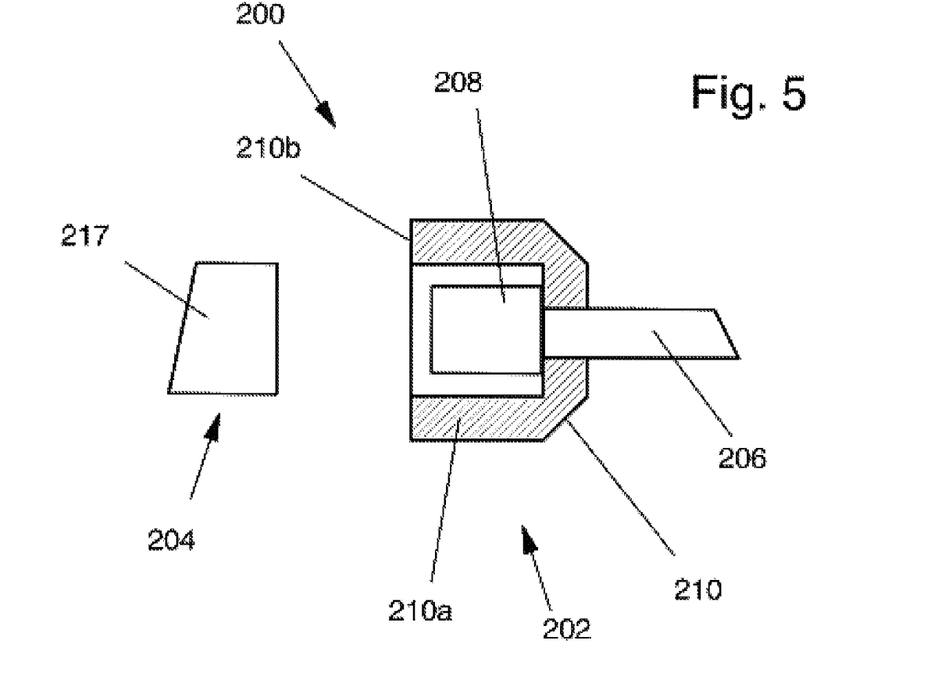
FIG. 5 shows the cable assembly of FIG. 2, removed from the card assembly.

In accordance with the present invention, cable assembly 202 is fitted with a cable boot 210, which is fitted on the cable 206. Cable boot 210 comprises a resilient, conductive material such as conductive rubber Cable boot 210 has a forwardly projecting portion 210a formed with a concavity for receiving the portion of the receptacle 217 projecting beyond the tailstock 222 when the connector 208 is connected by inserting it into the receptacle 217. Cable boot 210 extends slightly beyond the proximal end of its associated connector 208 when the cable assembly 202 and card assembly 204 are disconnected, as shown in FIG. 5, but is compressed to shield the interconnection when the cable assembly 202 and card assembly 204 are plugged together as shown in FIG. 2. More particularly, forwardly projecting portion 210a has a broad leading edge portion 210b adapted to press against the tailstock 222 to form a resilient seal with the tailstock 222 when the connector 208 is connected, electromagnetically shielding the connector 208 and the receptacle 217. Cable boot 210 thus fully covers the receptacle 217 of the transceiver 216 and presses against the tailstock 222 on the front of the board 212 to provide a protective shield against electromagnetic interference (EMI) as well as electrostatic discharge (ESD).

Figure 3:
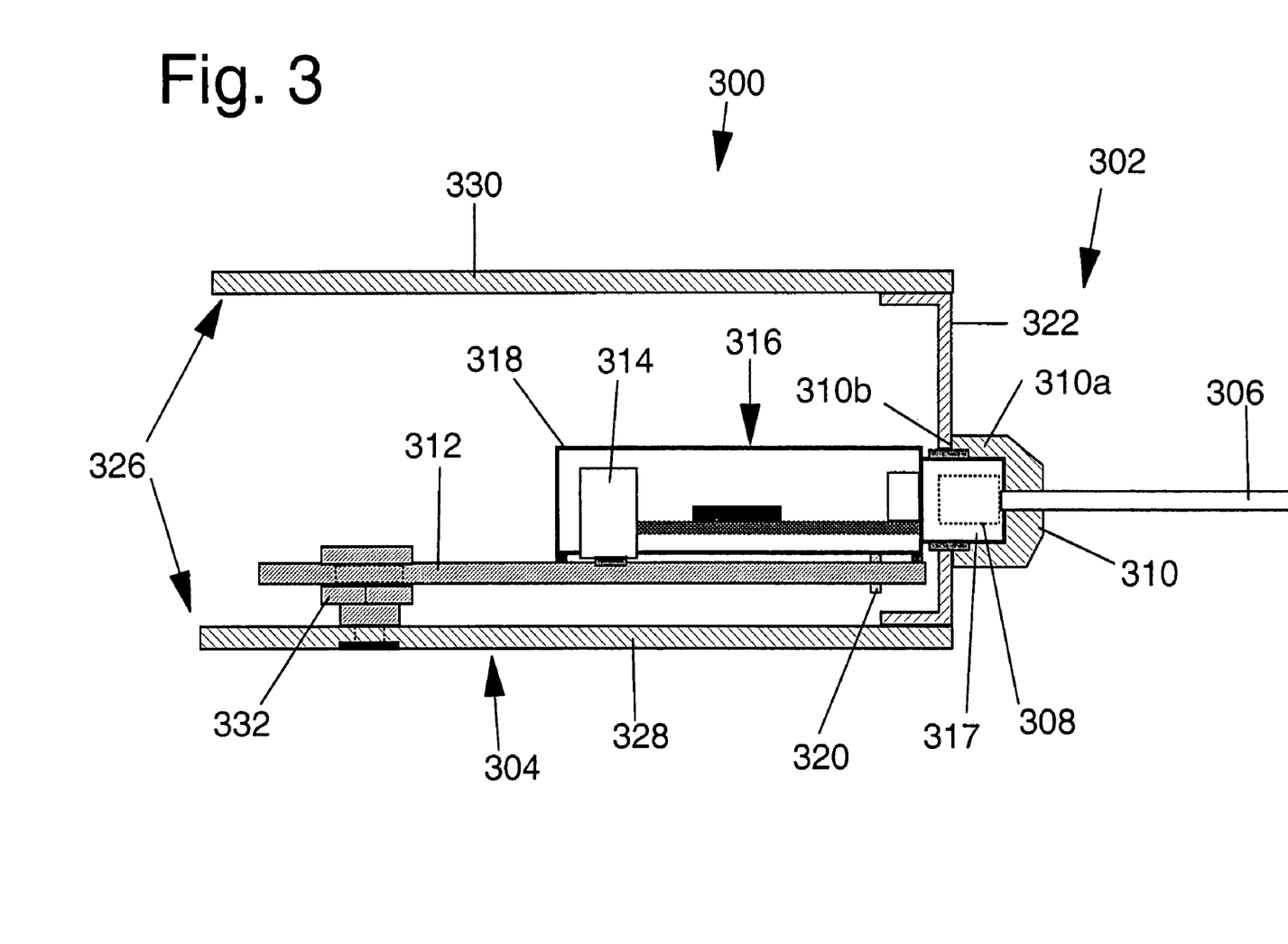
FIG. 3 illustrates one example of an alternative embodiment.

FIG. 3 illustrates one example of an alternative embodiment 300, showing the invention applied to a printed wiring board which is packaged within an enclosure. Elements 302-322 shown are similar to elements 202-222 shown in FIG. 2, except for the differences described below, and hence will not be individually described. Embodiment 300 differs from embodiment 200 in that it includes a conductive enclosure 326, the bottom cover 328 and top cover 330 of which are shown. Board 312 is secured to bottom cover 328 by means of one or more support elements 332. Additionally, front tailstock 322 is secured to the enclosure cover 326 rather than the board 312. Although not shown in FIG. 3, enclosure 328 extends around the sides and rear of the board 312 in a similar manner.

The embodiment 300 shown in FIG. 3 serves to seal the one remaining aperture (the opening in tailstock 322 for receptacle 317) in the enclosure 326 (through the mating of the boot 310 with the tailstock 322), such that a complete Faraday shield is created around the optical transceiver components. It will be apparent to those skilled in the art that variations of this approach are applicable to both parallel optical interfaces, such as pluggable InfiniPak-compliant modules, and serial interfaces, such as small-form-factor pluggable (SFP) compliant modules.

Figure 4:
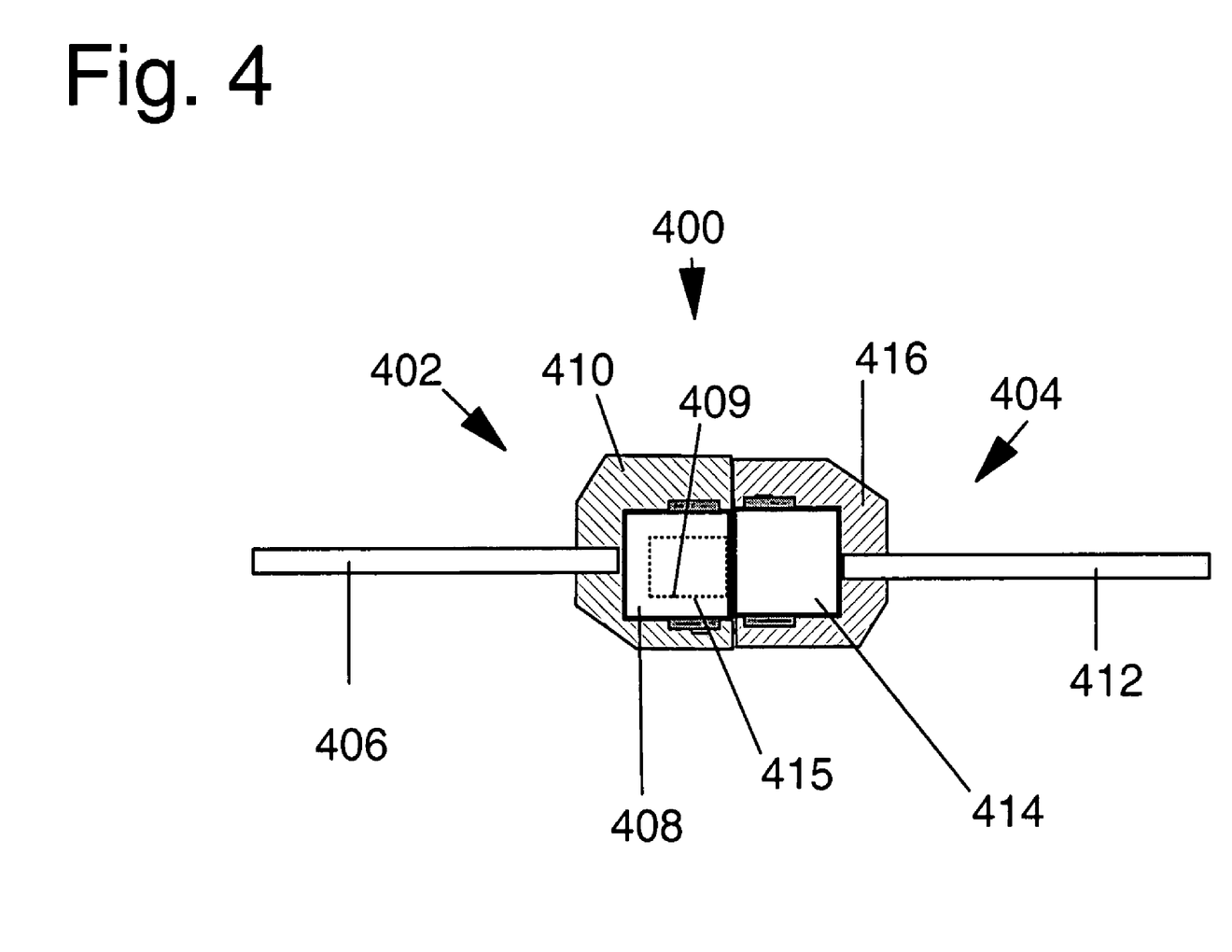
FIG. 4 illustrates one example of a cable-to-cable connection.
Figure 6:
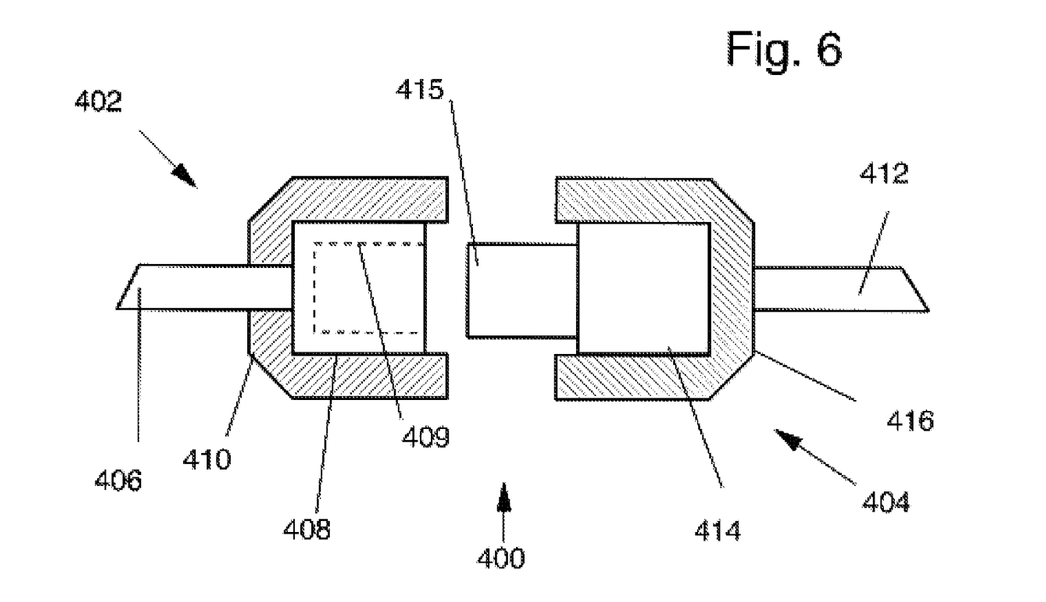
FIG. 6 shows the cable-to-cable connection of FIG. 4, with the two cable assemblies disconnected.

FIG. 4 illustrates one example of a cable-to-cable connection 400 between a first cable assembly 402 and a second cable assembly 404. Cable assembly 402 comprises a cable 406 having a connector 408 fitted with a cable boot 410, while cable assembly 404 similarly comprises a cable 412 having a connector 414 fitted with a cable boot 416. Connector 414 is a male connector having a reduced-diameter projecting portion 415, while connector 408 is a female connector having a corresponding concavity 409 for receiving connector portion 415. As with the cable boots in the previous embodiments, cable boots 410 and 416 each comprise a resilient, conductive material and have mating surfaces that extend slightly beyond the mating surfaces of their associated connectors 408 and 414 when the cable assemblies 402 and 404 are disconnected, as shown in FIG. 6, but are compressed to shield the interconnection when the cable assemblies 402 and 404 are plugged together.

To summarize the above description, the cable boot consists of a conductive rubber-type material, which provides strain relief for a fiber optic cable when the connector/cable assembly is inserted into a fiber optic receptacle on a circuit card assembly.

The boot is designed to extend from the rear of a fiber optic connector, at the junction where it meets the fiber optic cable, around the entire connector body, and extending beyond the front of the connector body such that it will be forced to compress when the connector is inserted into a receptacle and which will restore to its original shape when removed from the receptacle.

The boot is designed to envelop the optical connector and form a conductive shield around the fiber optic receptacle aperture, while making electrical contact with the front tailstock of a circuit card assembly and be at the same electrical potential as the front tailstock.

The cable boot, when applied to a circuit card assembly packaged in an electrically conductive enclosure, forms a conductive seal at the same potential as the enclosure.

The cable boot is especially advantageous when the optical cable assembly is a parallel optical fiber assembly such as a 12-fiber-wide ribbon cable, or a higher-fiber-count ribbon cable, or alternatively where the cable assembly is a serial or duplex cable assembly.

Other advantages of the cable boot of the present invention should be apparent from the above description. The cable boot provides a conductive path from the boot itself to the tailstock of a circuit card or card package, capable of draining off static electrical charge which may accumulate on either the optical cable assembly, circuit card assembly, or both. The cable boot can also accommodate the differences in tolerances between a typical circuit card assembly (±20 mils from the card reference datum to the card edge) and the edge tolerance of a typical pluggable or solderable optical transceiver or transmitter/receiver component with one or more optical channels (±1 mil from the optical receptacle aperture to the electrical connector which attaches the active optical components to the circuit card).

The cable boot is capable of enveloping the front end of the optical transmitter/receiver device, if such device is pluggable and can be removed from the circuit card.

The cable boot is compatible with connector-to-connector attachments as well as connector-to-transceiver attachments; when two connectors are mated at a patch panel or coupler, the compliant boots will deform on both sides of the interface to permit the optical connectors to mate, and when the connectors are unmated the boots will return to their original shape.

Finally, the cable boot is removable and replaceable by a service technician, since the boot is sufficiently compliant that it may be slipped over the connector body with the application of nominal force, and will elastically close around the rear of the optical connector to retain its position and orientation with respect to the optical connector.

While preferred embodiments of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A cable boot for use in a connector assembly in which a fiber optic connector terminating one end of a fiber optic cable is adapted to be connected to a mating component said mating component having a transversely extending conductive surface portion and a receptacle accessible through an opening in said surface portion for receiving said connector when the connector is connected, said cable boot comprising a resilient, conductive material and being adapted to be fitted on said cable, said cable boot having a forwardly projecting portion having a broad leading edge portion adapted to press longitudinally against said transversely extending conductive surface portion to form a transversely extending resilient seal therewith when the connector is connected, thereby electromagnetically shielding said connector and said receptacle, said receptacle projects beyond said transversely extending conductive surface portion of said mating component and in which said forwardly projecting portion of said cable boot is formed with a concavity for receiving the portion of said receptacle projecting beyond said transversely extending conductive surface portion when the connector is connected, said forwardly projecting portion of said cable boot extends beyond said connector when the connector is disconnected, in which said mating component comprises an optical transceiver having circuitry for transmitting and receiving optical signals over said fiber optic cable, and in which said optical transceiver is a pluggable transceiver having said receptacle at one end, said cable boot being adapted to envelop said end of said transceiver when said fiber optic connector is connected thereto.

2. A cable boot as in claim 1 in which said mating component comprises another connector.

3. A cable boot as in claim 1, said cable boot surrounding said connector from a distal end to a proximal end relative to said receptacle.

4. A cable boot as in claim 3, said cable boot being adapted to close around said distal end of said connector to retain its position and orientation with respect to said connector.

5. A cable boot as in claim 1, said cable boot being removable from said connector.

6. A connector assembly comprising:
a fiber optic cable;
a fiber optic connector terminating one end of said cable and adapted to be connected to a mating component, said mating component having a transversely extending conductive surface portion and a receptacle accessible through an opening in said surface portion for receiving said connector when the connector is connected; and
a cable boot fitted on said cable, said cable boot comprising a resilient, conductive material and having a forwardly projecting portion having a broad leading edge portion adapted to press longitudinally against said transversely extending conductive surface portion to form a transversely extending resilient seal therewith when the connector is connected, thereby electromagnetically shielding said connector and said receptacle, said receptacle projects beyond said transversely extending conductive surface portion of said mating component and in which said forwardly projecting portion of said cable boot is formed with a concavity for receiving the portion of said receptacle projecting beyond said transversely extending conductive surface portion when the connector is connected, said forwardly projecting portion of said cable boot extends beyond said connector when the connector is disconnected, in which said mating component comprises an optical transceiver having circuitry for transmitting and receiving optical signals over said fiber optic cable, in which said optical transceiver is a pluggable transceiver having said receptacle at one end, said cable boot being adapted to envelop said end of said transceiver when said fiber optic connector is connected thereto.

7. A connector assembly as in claim 6 in which said mating component comprises another connector.

8. A connector assembly as in claim 6 in which said cable boot surrounds said connector from a distal end to a proximal end relative to said receptacle.

9. A connector assembly as in claim 8 in which said cable boot is adapted to close around said distal end of said connector to retain its position and orientation with respect to said connector.

10. A connector assembly as in claim 6 in which said cable boot is removable from said connector.

* * * * *